United States Patent [19]
Boileau

[11] 3,841,374
[45] Oct. 15, 1974

[54] TIRES

[75] Inventor: Jacques Boileau, Clermont-Ferrand, France

[73] Assignee: Compagnie Generale Des Establissements Michelin, raison sociale Michelin & Cie, Clermont-Ferrand, France

[22] Filed: Mar. 23, 1973

[21] Appl. No.: 344,423

[30] Foreign Application Priority Data
Apr. 4, 1972  France .............................. 72.11838

[52] U.S. Cl. ........................................... 152/209 R
[51] Int. Cl. ............................................ B60c 11/06
[58] Field of Search ................................ 152/209 R

[56] References Cited
UNITED STATES PATENTS

| | | | |
|---|---|---|---|
| 3,030,999 | 4/1962 | Wolfer | 152/209 R |
| 3,437,120 | 4/1969 | Verdier | 152/209 R |
| 3,556,191 | 1/1971 | Mills | 152/209 R |
| 3,707,177 | 12/1972 | Boileau | 152/209 R |

*Primary Examiner*—Drayton E. Hoffman
*Attorney, Agent, or Firm*—Brumbaugh, Graves, Donohue & Raymond

[57] ABSTRACT

Delivery truck tires capable of operating at high speeds and under heavy loads and having the properties of good adherence to wet roads, cornering performance, wear resistance and drainage of the tread are achieved by means of a tread design which presents a pronounced pressure gradient on the road by virtue of having circumferential ribs with a rigid central zone and flexible lateral zones.

10 Claims, 4 Drawing Figures

TIRES

The present invention relates to improvements in tires, particularly radial carcass tires, which are intended especially for delivery trucks or similar vehicles, that is to say, vehicles which are both relatively fast and relatively heavy. More particularly, it concerns the pattern of the tread of such tires.

Tires for delivery trucks pose a particular problem with respect to the pattern of the tread. This type of tire, as a matter of fact, has requirements which are cumulative of the requirements for rapid vehicles, such as passenger cars, and those for heavy vehicles, such as trucks and buses. A delivery truck tire may, as a matter of fact, be used at relatively high speeds reaching or exceeding 120 km/hr, with an inflation pressure of generally between 3 and 6 atm., and therefore rather high, and bearing a load of the order of 750 to 1,500 kg.

Due to these general conditions of use, the tread of tires of this type must present both the rigidity of the treads of heavy vehicle tires and the mobility of the treads of passenger car tires. Like all tires, they must present qualities of adherence, particularly to wet roads, cornering and resistance to wear, but must do so under much harder conditions. The present invention is directed at obtaining these qualities to a high degree for tires of the category in question, particularly radial carcass tires. For this purpose it uses a specific distribution of the pressures exerted on the ground by the elements in relief, combined with a particularly effective system of drainage by recessed elements of the area in contact with the ground.

The tire particularly a radial carcass tire, for delivery trucks which forms the object of the invention, the tread of which is composed of a plurality of continuous circumferential ribs separated from each other by relatively wide zigzag circumferential grooves, said ribs being cut transversely by relatively narrow blind grooves debouching into the zigzag circumferential grooves and being cut by thin, deep lamellae, is characterized by the fact that the transverse grooves and the lamellae are located on the borders of the circumferential ribs so as to define in each circumferential rib a central zone of substantial width which is not cut in depth and accordingly is rigid, and by the fact that the transverse grooves which debouch into the zigzag circumferential grooves have a flared shape and accordingly favor the flexibility or mobility of the borders of the ribs and the drainage of their entire surface.

The presence of each circumferential rib, on the one hand, of a central zone which is not cut in depth and, on the other hand, of lateral zones of a mobility which increases in the direction towards the edges produces a pronounced gradient in the pressures exerted on the ground. This assures all at once rigidity of the rib, which is favorable to cornering and resistance to wear, mobility, which is favorable to adherence, and the channeling of water from the regions of high pressure towards regions of reduced pressure.

In accordance with particular features which constitute preferred embodiments of the invention:

a. The central zone which is not cut in depth of each rib occupies a transverse width which is between one-quarter and one-half of the traverse width of the rib; a central zone and two lateral zones of approximately equal width constitute generally a satisfactory compromise;

b. The transverse grooves are arranged obliquely at least over a portion of their lenght. Their edges form angles of between 45° and 90° with the circumferential direction, these angles being definitely greater than the angles of between 15° and 25° of the edges of the zigzag circumferential grooves. It is favorable that the general direction of the transverse grooves be approximately perpendicular to one of the directions of the segments forming the zigzags of the circumferential grooves, or else that the divergent edges of the transverse grooves and of the circumferential grooves intersect at a right angle or approximately a right angle. The oblique arrangement of the transverse grooves increases the total length of the lines forming the edges of the circumferential ribs in relief, which is favorable to adherence. The perpendicularity of the grooves or edges makes it possible to avoid acute angles of elements in relief which constitutes a cause of fragility;

c. The transverse grooves debouching on each side of one and the same circumferential groove are staggered and have parallel orientations. The transverse grooves cutting the edges of one and the same circumferential rib are also staggered but have symmetrical orientations, except possibly with respect to the lateral ribs if the latter are definitely wider than the central ribs;

d. The funnel or flared shape of the transverse grooves is such that the ratio between the maximum width at the point of debouchment into the circumferential grooves and the minimum width at the closed end is between about 2:1 and about 5:1. The maximum width does not substantially exceed the minimum width of the circumferential grooves;

e. In accordance with a first variant, the transverse grooves cut the tips, that is to say, the protuberant portions, of the circumferential ribs; in this case the transverse grooves advantageously extend over a length which, measured perpendicular to the circumferential groove, is at least equal to the width of the latter. In accordance with a second variant, the transverse grooves cut the hollows, that is to say, the re-entrant portions, of the circumferential ribs; in this case preferably the transverse grooves extend over a length which, measured perpendicular to the circumferential groove, is less than the width of the latter. The first variant imparts to the ribs a less massive, more cut out structure, resulting in greater adherence; the second variant, on the other hand, gives a more massive structure which results in better cornering power and better resistance to wear;

f. The number of circumferential ribs is 4 or 5, depending on the size of the tire, the two lateral ribs being wider than the two or three central ribs. Accordingly, there are three or four circumferential grooves; they are preferably identical and occupy a total of about 20 percent of the width of the tread;

g. The transverse grooves arranged on the lateral ribs, at the edges of the tread, extend into the sidewalls;

h. The lamellae provided in the lateral zones of the circumferential ribs are arranged approximately parallel to the zigzag edges of the circumferential grooves and between the successive transverse grooves, except possibly on the edges of the tread. They may possibly be connected to each other by cuts of small depth of the same width.

The present invention is illustrated by the two embodiments which will be described with reference to the accompanying drawings.

Figure 2:
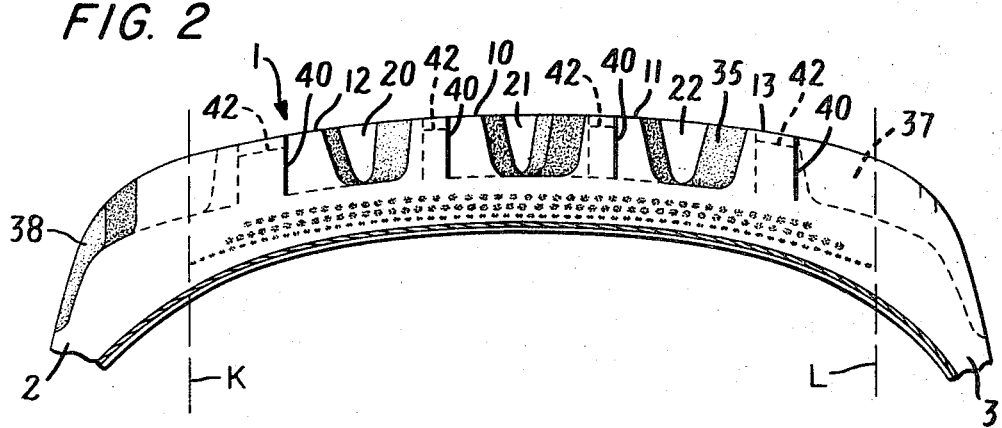
FIG. 2 is a radial section of the tread along the line II—II of FIG. 1.

The various figures show the design of two treads of radial carcass tires of size 700 – 16 for delivery trucks. In all figures, identical parts have been provided with the same reference numbers or letters.

1 designates a tread. The portion of the tread whice normally rests on the ground is bounded by the lines K and L separating it from the sidewalls 2 and 3.

The tread 1 is composed of four circumferential ribs, of which two, 10 and 11, are central and two, 12 and 13, which are substantially wider, are lateral. Between the ribs 10 to 13 and limiting them are three zigzag circumferential grooves 20, 21, 22, each composed of successive elements A and B inclined by an angle of 20° to the equatorial line XY, on the one hand towards the right and on the other hand towards the left. At the junction of each element A and each element B, alternately on one side and the other, there debouch into the circumferential grooves 20, 21, 22 transverse grooves 30, 31, 32, 33, 34, 35 cutting the ribs 10 to 13. The lateral ribs 12 and 13 are cut furthermore by grooves 37 and 38 continued into the sidewalls. The four ribs are furthermore cut near the grooves 20, 21, 22 and approximately parallel to them by deep lamellae 40, 41 connected to each other in each rib 10 to 13 by superficial cuts 42, 43 completing the outline of the lamellae 40, 41.

Figure 1:
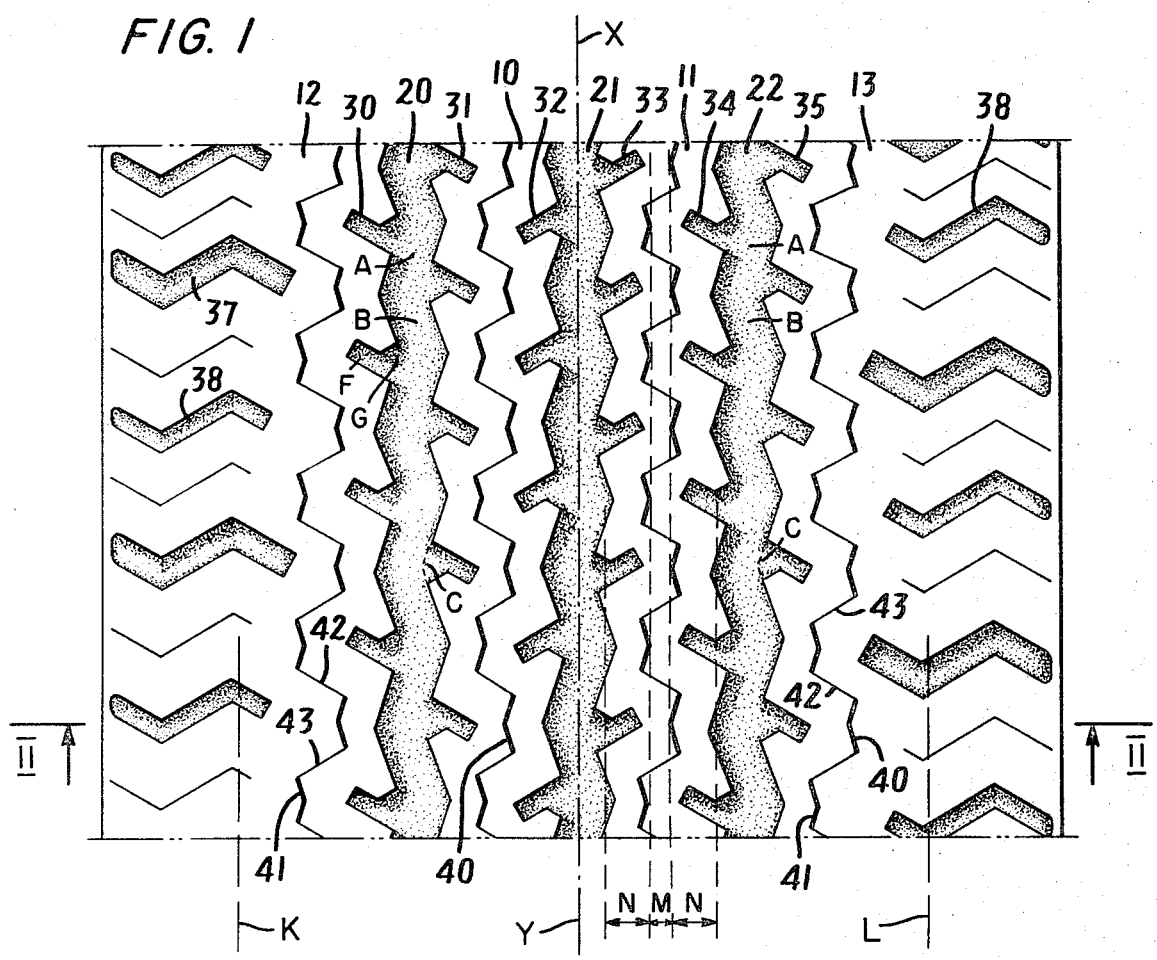
FIG. 1 is a plan view of a portion of the tread of a tire in accordance with the invention.
Figure 3:
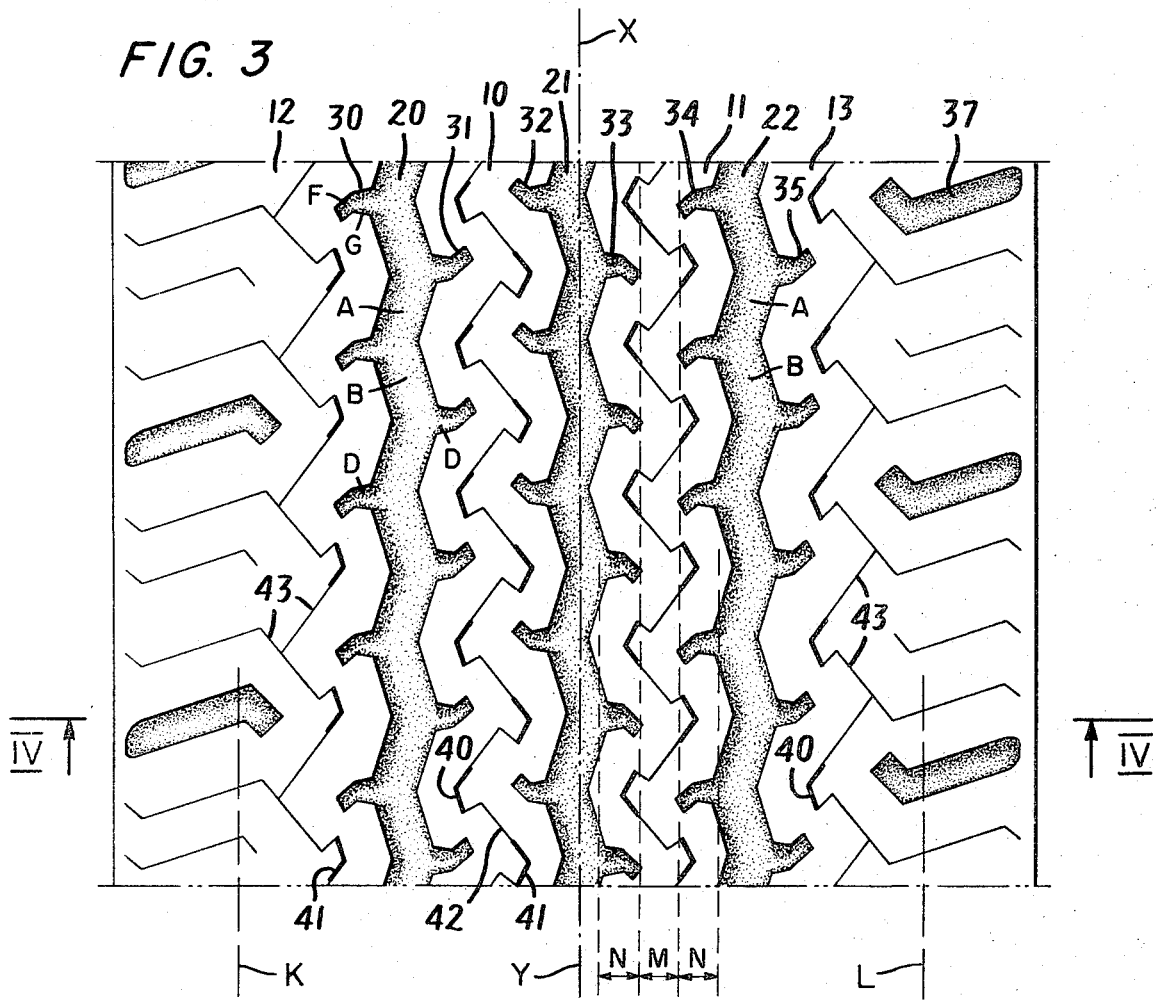
FIG. 3 is a plan view of a portion of the tread of another tire in accordance with the invention.

As can be noted from FIGS. 1 and 3, each rib 10 to 13 has a central zone M which is free of grooves and of deep lamellae. This central zone M has been indicated in FIG. 3 by connecting by dashed lines the adjacent ends of the lamellae 40 and 41 and of the respective transverse grooves 33 and 34, in the case of the rib 11. In FIG. 1 this central zone M has been indicated by connecting by dashed lines the adjacent apexes of lamallae 40 and 41 in the case of rib 11. The central zone M has an average width which is of the order of one-third of the average width of the ribs 10 to 13. The presence of this continuous and not cut in depth central zone M included between two lateral zones N cut by the transverse grooves 30 to 35 constitutes one of the basic characteristics of the invention. This rigid central zone M constitutes the skeleton of the ribs 10 to 13 and exerts on the ground a pressure which is substantially greater than that exerted by the adjacent zones N which are made flexible by the proximity of the circumferential grooves 20 to 22 and by the interruptions formed by the transverse grooves 30 to 35.

As can also be observed, the transverse grooves 30 to 35 furthermore have a flared shape, each being composed of a portion F with parallel edges penetrating deep into the ribs 10 to 13 and of a portion G having divergent edges at the outlet into the circumferential grooves 20 to 22. This funnel or flared shape is also one of the basic characteristics of the invention and produces both the flexibility or mobility of the lateral zones N of the ribs 10 to 13 and a good drainage of the entire surface of these grooves.

The transverse grooves 30 to 35 have a general orientation which is perpendicular to the segments A of the grooves 20 and 22 or the segments B of the groove 21. Furthermore, in the case of FIG. 1, the divergent edges in the portions G of the grooves 30 to 35 approach the edges of the segments A and B of the grooves 20 to 22 approximately perpendicularly.

In the variant of FIGS. 1 and 2, the grooves 30 to 35 cut the protruding tips C of the ribs 10 to 13. They extend perpendicular to the segments A and B over a length slightly greater than the width of the segments A and B. In this same variant, the width of the grooves 30 to 35 varies between a maximum value at the place of their entry into the grooves 20 to 22, approximately equal to that of the segments A and B, and a minimum value in their portion F which is equal approximately to one-thrid of the width of the segments A and B.

Figure 4:
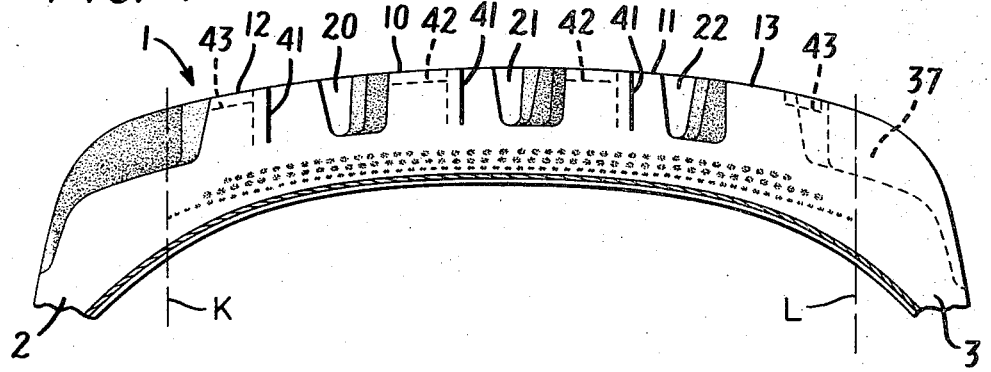
FIG. 4 is a radial section of the tread along the line IV—IV of FIG. 3.

In the variant of FiGS. 3 and 4, the grooves 30 to 35 are located in the hollows D of the ribs 10 to 13. Their length, measured perpendicular to the segments A and B, is definitely less than the width of these segments A and B. Moreover, while the portions F have approximately the same width as in the case of FIGS. 1 and 2, the portions G are definitely less wide and have a maximum width close to twice that of the portions F.

As can be noted, the transverse grooves 30 and 31 debouching into the circumferential groove 20, 32 and 33 debouching into the groove 21, and 34 and 35 debouching into the groove 22 have parallel orientations respectively. On the other hand, the transverse grooves 31, 32 cutting the rib 10, or the grooves 33, 34 cutting the rib 11 have symmetrical orientations. This arrangement favors the rigidity of the central zone M of the ribs, as well as the good drainage of the tread.

In order to clarify ideas, in the case of a tread having a width of 121 mm between the lines K and L, the width of the grooves 20 to 22 perpendicular to the segments A or B is 7.5 mm., the width of the ribs 10 and 11, measured along the same direction, is 20 mm., and the width of the ribs 12 and 13 is 25 mm. approximately.

FIGS. 2 and 4 make it possible to note that the circumferential grooves 20 to 22, the transverse grooves 30 to 35, the lamellae 40, 41 all have the same depth, of the order of 10.5 mm. On the other hand, the superficial cuts 42, 43 have a depth of only 1.7 mm.

Tests carried out on delivery truck tires having treads designed in the manner shown in FiGS. 1 to 4 have shown particularly good adherence on a wet road, a cornering performance, and a resistance to wear superior to that of the known treads used on commercial tires, even under conditions of load and speed which are at the limit of the normal conditions.

What is claimed is:

1. In a tire for delivery trucks whose tread is composed of a plurality of continuous circumferential ribs separated from each other by relatively wide zigzag circumferential grooves, said ribs being cut transversely by relatively narrow blind grooves debouching into the zigzag circumferential grooves and being cut by thin, deep lamellae, the improvement which comprises the transverse grooves and the lamellae being located on the borders of the circumferential ribs so as to define in each circumferential rib a central zone of a transverse width of between one-quarter and one-half of the transverse width of the rib and which central zone is not cut in depth and accordingly is rigid, and the transverse grooves which debouch into the zigzag circumferential grooves having a flared shape and their edges form angles with the circumferential direction which are definitely greater than the angles of the edges of the zigzag circumferential grooves and accordingly favoring the mobility of the borders of the ribs and the drainage of their entire surface.

2. The tire defined by claim 1 wherein the transverse grooves are arranged obliquely at least over a portion of their length and the direction of the transverse grooves is approximately perpendicular to one of the directions of the segments forming the zigzags of the circumferential grooves.

3. The tire defined by claim 1 wherein the divergent edges of the transverse grooves intersect the edges of the circumferential grooves approximately at a right angle.

4. The tire defined by claim 1 wherein the transverse grooves debouching into the same circumferential groove have parallel orientations, while those which intersect the edges of the same circumferential rib have symmetrical orientations, the said transverse grooves debouching in the same circumferential groove or intersecting the same circumferential rib being staggered in circumferential direction.

5. The tire defined by claim 1 wherein the transverse grooves have maximum and minimum widths which are in a ratio of between 2:1 and 5:1.

6. The tire defined by claim 1 wherein the transverse grooves cut the tips of the circumferential ribs and have a length which is at least equal to the width of the circumferential grooves.

7. The tire defined by claim 1 wherein the transverse grooves cut the hollows of the circumferential ribs and have a length less than the width of the circumferential grooves.

8. The tire defined by claim 1 wherein there are four circumferential ribs and three circumferential grooves, the lateral circumferential ribs being wider than the central circumferential ribs and the circumferential grooves being identical and occupying a total of about 20 percent of the width of the tread.

9. The tire defined by claim 1 wherein the lamellae are arranged approximately parallel to the zigzag circumferential grooves.

10. The tire defined by claim 1 wherein there are five circumferential ribs and four circumferential grooves, the lateral circumferential ribs being wider than the central circumferential ribs and the circumferential grooves being identical and occupying a total of about 20 percent of the width of the tread.

* * * * *